(12) United States Patent
Van Der Horn et al.

(10) Patent No.: US 7,042,203 B2
(45) Date of Patent: May 9, 2006

(54) DC-DC CONVERTER

(75) Inventors: Gerrit Van Der Horn, Delft (NL); Johan Christiaan Halberstadt, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/516,148

(22) PCT Filed: May 27, 2003

(86) PCT No.: PCT/IB03/02378

§ 371 (c)(1),
(2), (4) Date: Nov. 30, 2004

(87) PCT Pub. No.: WO03/103119

PCT Pub. Date: Dec. 11, 2003

(65) Prior Publication Data

US 2005/0206358 A1    Sep. 22, 2005

(30) Foreign Application Priority Data

Jun. 4, 2002   (EP) .................................. 02077196
Sep. 9, 2002   (EP) .................................. 02078662

(51) Int. Cl.
*G05F 1/56*    (2006.01)
(52) U.S. Cl. ....................... 323/285; 323/225; 323/271
(58) Field of Classification Search ................ 323/225, 323/271, 282, 285
See application file for complete search history.

(56) References Cited

U.S. PATENT DOCUMENTS

| 5,982,160 | A | * | 11/1999 | Walters et al. | ............... 323/282 |
| 5,994,885 | A | * | 11/1999 | Wilcox et al. | ............... 323/285 |
| 6,064,187 | A | * | 5/2000 | Redl et al. | .................... 323/285 |
| 6,157,182 | A | * | 12/2000 | Tanaka et al. | ............... 323/284 |
| 6,229,292 | B1 | * | 5/2001 | Redl et al. | .................... 323/285 |
| 6,366,070 | B1 | * | 4/2002 | Cooke et al. | ................ 323/284 |
| 6,469,481 | B1 | * | 10/2002 | Tateishi | ....................... 323/282 |
| 6,600,298 | B1 | * | 7/2003 | McDonald et al. | .......... 323/271 |
| 6,674,272 | B1 | * | 1/2004 | Hwang | ......................... 323/284 |
| 6,674,274 | B1 | * | 1/2004 | Hobrecht et al. | ........... 323/285 |
| 6,873,140 | B1 | * | 3/2005 | Saggini et al. | ............... 323/283 |
| 6,879,136 | B1 | * | 4/2005 | Erisman et al. | .............. 323/282 |

FOREIGN PATENT DOCUMENTS

JP     2000-299978     * 10/2000

* cited by examiner

*Primary Examiner*—Jeffrey Sterrett
(74) *Attorney, Agent, or Firm*—Aaron Waxler

(57) ABSTRACT

A DC—DC converter with an inductor (L) and a switch (S1, S2) comprises an averaging circuit (2) which generates an average correction signal (ACS) representative for the difference of the peak current (IPEAK) and the actual average current (IAVE) through the inductor (L). A controller (2, 3, 4) controls the output voltage (VOUT) of the DC—DC converter based on regulating the duty-cycle of the switch (S1, S2) dependent on a sense signal (SES) passing a reference current level (RPCS), as in prior art peak current or valley current controlled DC—DC converters, but now using a reference current level (RPCS) that is also based on the average correction signal (ACS) and not only on the output voltage (VOUT). This enables the converter to control the output voltage (VOUT) more precisely.

10 Claims, 8 Drawing Sheets

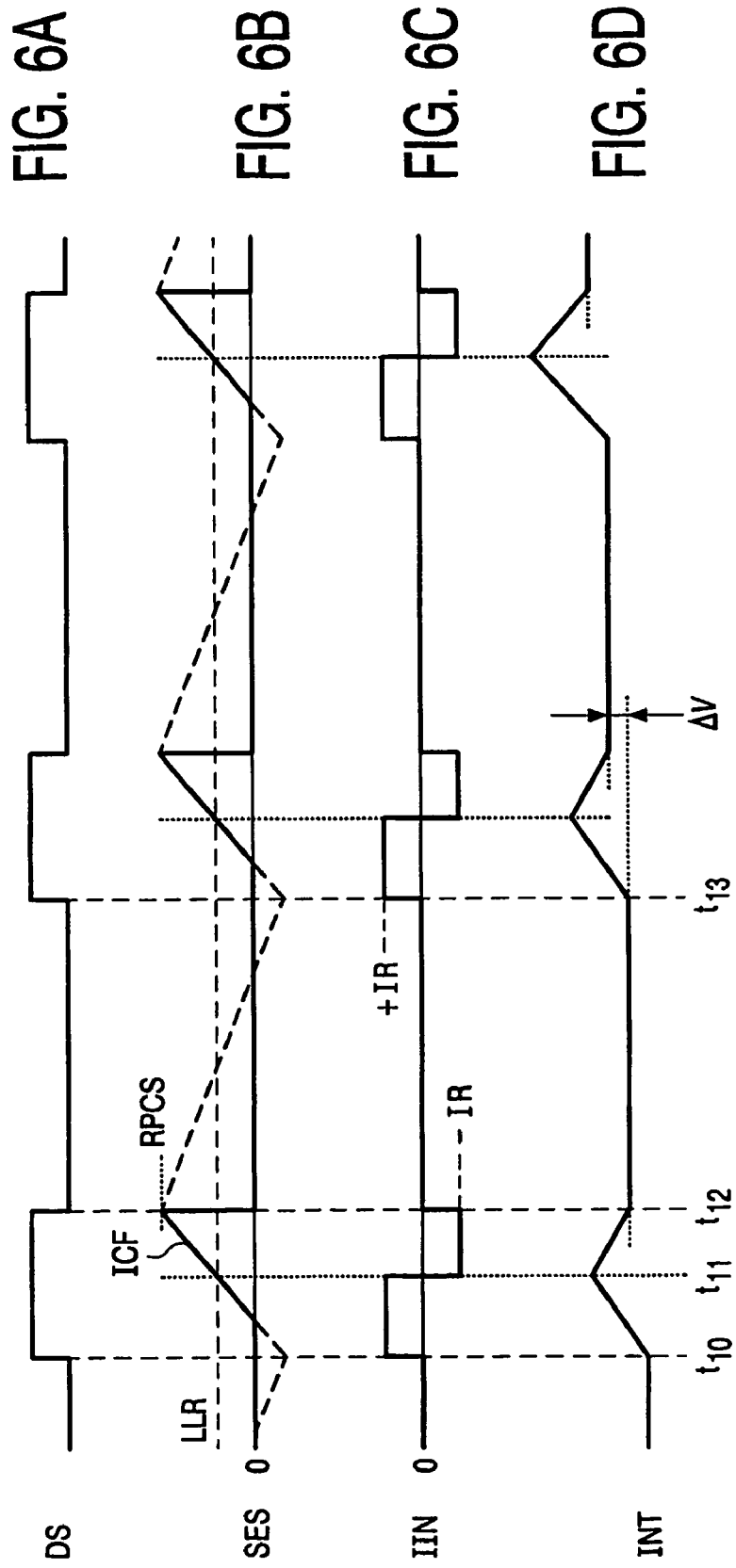

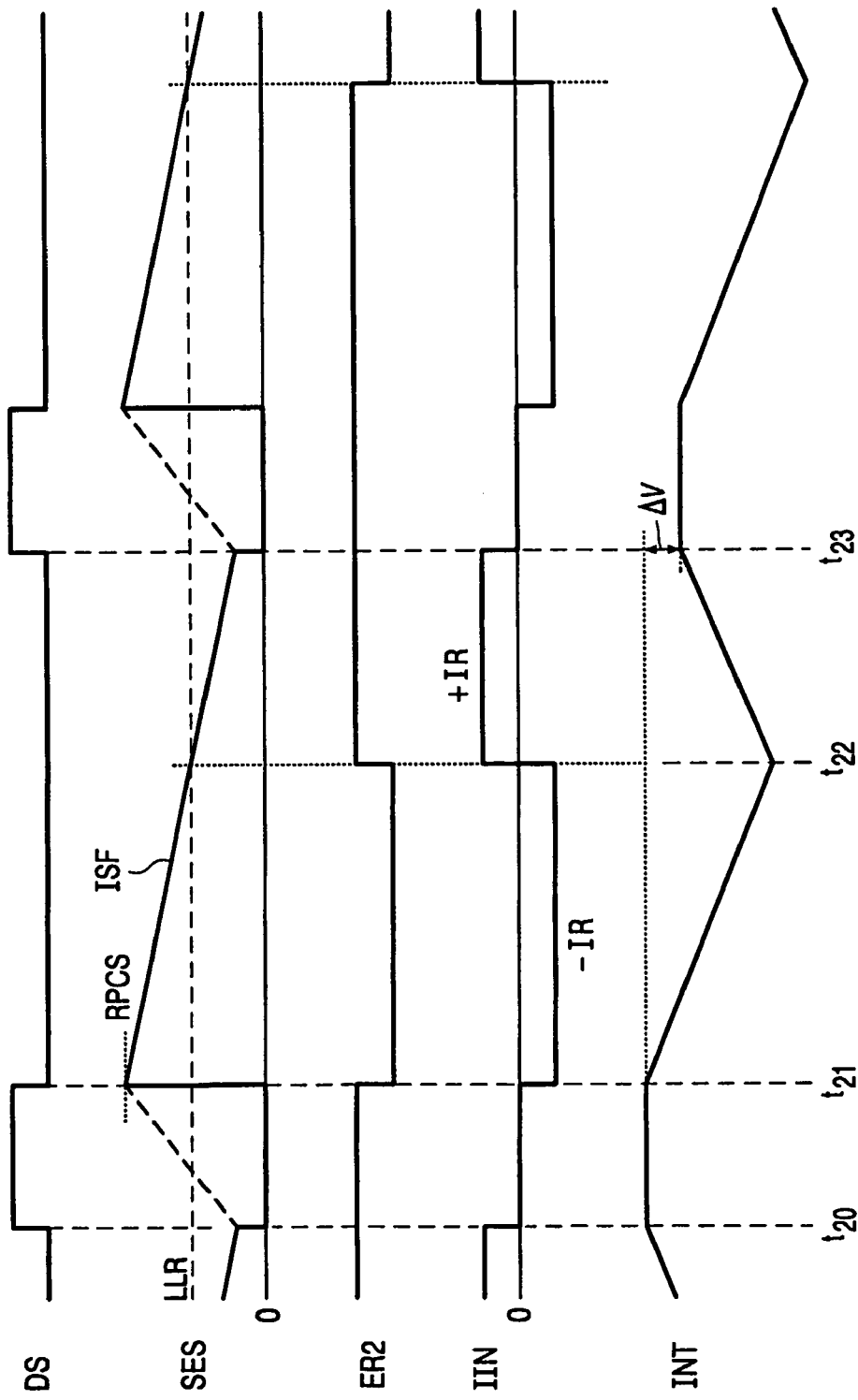

DC-DC CONVERTER

U.S. Pat. No. 4,148,097 discloses a DC to DC converter wherein the output voltage is regulated by the control of current pulses in an inverter stage. Voltage regulation is obtained by directly comparing a current feedback signal from the inverter stage to a current threshold level. The output signal of the inverter stage is rectified and filtered, and the resulting DC output voltage is compared to a reference voltage to generate an error signal. This error signal drives a voltage amplifier which sets the current threshold level. A transformer which measures the current in the inverter stage supplies the current feedback signal. When the measured current feedback signal exceeds the current threshold level, the current pulse in the inverter stage is terminated.

Such a peak current control has the advantage that the converter has a fast response on changes in the current drawn by the load, known as load step response. However, the known peak current controlled converter has the disadvantage that the accuracy of the output voltage is not optimal. In particular the accuracy of the output voltage as a function of the load current (the load line) is not optimal. Prior art valley current controlled DC—DC converters show the same disadvantage.

It is an object of the invention to provide a DC—DC converter which has a fast response on load changes and which has an improved accuracy.

A first aspect of the invention provides a DC—DC converter as claimed in claim 1. A second aspect of the invention provides an electronic apparatus comprising such a DC—DC converter is claimed in claim 10. Advantageous embodiments are defined in the dependent claims.

The prior art DC—DC converter supplies a current from a DC input voltage to a load. The DC output voltage across the load has a lower value than the DC input voltage in the considered case of a down converter. The converter comprises a regulator and a number of power switches which are coupled to one of the ends of a winding of the transformer (the inductor), another end of the winding being coupled to the load. The regulator controls the power switches with pulse-width-modulated signals, further referred to as PWM signals, to alternately switch the inductor between the poles of the DC input voltage in such a way that the winding delivers a current with a triangular waveform to the load. In the on-phase wherein the inductor is connected to the positive pole of the DC input voltage, the current through the inductor increases substantially linearly. When the current through the inductor reaches a peak current level (the current threshold level), the on-phase is terminated and the winding is coupled to the other pole of the DC input voltage which usually is ground. Now, the current through the inductor winding starts to decrease linearly. At a particular instant, usually determined by an oscillator, a next on-phase is started.

A control loop controls the peak current level of the current through the transformer winding at which the on-phase is terminated depending on a difference between the output voltage and a reference voltage. The output voltage settles when the average winding current is equal to the load current demanded by the load. Thus, it is the load that determines the output current which is required, and the control loop that determines the output voltage at which the converter is able to supply this output current.

A known converter construction exists which in a similar way controls the instant at which the off-phase is terminated based on the valley level of the inductor current. Such a valley current controlled converter is in fact the inverse case of a peak current controlled converter, and is more likely to be used in application where the down-conversion ratio (VOUT/VIN) is less than 2, which means PWM duty-cycles are higher then 50%. Nevertheless, all elements that can be applied in a peak current controlled converter can be applied in a valley controlled converter in similar way (inversion). This concept is not further elaborated, but included in the claims.

By way of example, in particular applications, for example, when the load is a microprocessor, it is required that the output voltage decreases when the load current required by the load increases. The relation between the output voltage and the load current has to follow a well-defined so-called load-line. For example, the converter should become a voltage source with well defined particular source impedance. In a practical application wherein the converter has to convert a DC input voltage of 12 Volts to a DC output voltage of 1.5 Volts which is supplied to a microprocessor, a voltage drop of 1.5 mV for each Ampere load current may be typically requested. Accuracy demands are always related to this load line: the output voltage must stay within the margin around the load line. For example, the margin may be ±25 mV.

In the prior art peak current control, the actual current in the inverter stage is compared with the current threshold level to terminate the on-phase. However, due to tolerances on the peak to peak value of the substantially sawtooth or triangle shaped current in the transformer winding, the average current supplied to the load is not exactly known. And, consequently, the output voltage which is required to be able to supply the load current is not exactly known. The tolerance on the peak to peak value of the substantially sawtooth or triangle shaped current in the transformer winding may be caused by a tolerance in the actual value of the inductor which in practical situations may differ up to 50% from the nominally specified value. In the particular applications referred to earlier, this tolerance on the output voltage or on the load line is not acceptable.

The DC—DC converter in accordance with the first aspect of the invention comprises an averaging circuit which generates an average correction signal representative for the difference of the peak current and the actual average current through the inductor (which in the prior art is the transformer winding). The controller controls the output voltage of the DC—DC converter not only based on the difference of the output voltage and the reference voltage as known from the prior art DC—DC converter, but also based on the actual average current, because the current threshold level now depends on the average correction signal also. As now at least part of the actual average current through the inductor is measured and used to control the converter, it is possible to achieve a higher accuracy of the output voltage.

The at least part of the actual average current through the inductor may also be measured in the switches coupled to the inductor.

In an embodiment as defined in claim 3, the reference level (the error signal of the prior art) which depends on the difference between the output voltage and the reference voltage is combined with the average correction signal. In this manner, a current threshold level is obtained which not only depends on the output voltage comparison with the reference voltage, but also on the average correction signal. Consequently, an instant of terminating the on-phase of the converter is determined by the average correction signal also.

In an embodiment as defined in claim 4, the load line circuit generates the reference level from the difference of the output voltage and the reference voltage. The load line indicates how the output voltage should depend on the output current of the converter. The load line may represent a desired output impedance of the converter.

The desired load line is less dependent on tolerances because the current threshold level depends on the average correction signal. Thus, the load line behavior is improved.

In an embodiment as defined in claim 5, the averaging circuit comprises a current comparator which compares the sense signal which indicates the current through the inductor with the reference level which represents a desired load-line to obtain an error signal. The desired load line indicates a desired change of the output voltage with an output current requested by the load. The integrator integrates the error signal to obtain the average correction signal, and the combiner combines the average correction signal with the reference level to adjust a level of the current threshold level. In this embodiment, the level of the current threshold level is adapted in accordance with the average correction signal also. It is also possible that the average correction signal influences the termination of the on-phase in another way. Instead of the integrator a low-pass filter or a combination of an integrator and a low-pass filter may be used.

In an embodiment as defined in claim 6, the averaging circuit comprises a window circuit for generating a window in time. The sense signal and the reference signal are relevant to the comparison during the window. The window is selected such that disturbances in the sense signal occur outside the window. The comparison improves because the sense signal is compared only when it is not disturbed.

In an embodiment as defined in claim 7, a current source which supplies a fixed and clean current is switched to change polarity at the instant the sense signal crosses the value indicated by the reference signal. The integration of the clean signal improves the accuracy of the converter.

In embodiments as defined in claims 8 and 9, instead of using the sense signal directly, an emulated current signal is generated. The emulated current signal is an emulation of the current through the inductor. Especially for small on-times of the converter, this emulated current signal is a better representation of the actual current through the inductor than the sense signal. This improves the accuracy of the converter.

These and other aspects of the invention are apparent from and will be elucidated with reference to the embodiments described hereinafter.

In the drawings:

FIG. 1 shows a prior art buck converter,

FIGS. 2A–2D show waveforms elucidating the operation of the prior art buck converter, FIG. 3 shows a buck converter with an average current control in accordance with an embodiment of the invention, FIGS. 4A–4F show waveforms elucidating the operation of the buck converter shown in FIG. 3, FIG. 5 shows an embodiment of the average current circuit, FIGS. 6A–6D show waveforms elucidating the operation of the average current circuit shown in FIG. 5, FIG. 7 shows an embodiment of the average current circuit, FIGS. 8A–8E show waveforms elucidating the operation of the average current circuit shown in FIG. 7, and FIG. 9 shows a buck converter with an average current control and a current emulator in accordance with an embodiment of the invention.

The same references in different Figs. refer to the same signals, or to the same elements performing the same functions.

FIG. 1 shows a prior art buck converter. A series arrangement of the sense element 1 and the controllable switches S1 and S2 is arranged to receive a DC input voltage VIN. The sense element 1 serves to sense and copy the current through switch S1 into a sense signal SES and is often implemented by a resistor in series with the switch S1. A junction of the switches S1 and S2 is connected via an inductor L to a load LO. A smoothing capacitor C is arranged in parallel with the load LO. A driver circuit 30 controls the switches S1 and S2 with the switching signal SI1 and SI2, respectively. The voltage across the inductor L is denoted by VL, the current through the inductor L is denoted by IL, and the output voltage VOUT occurs across the load LO.

The output voltage VOUT is compared by a comparator (any comparator referred to may be realized as a comparator, an amplifier, a subtractor or a combiner, the only relevant issue is that two signals are compared to obtain an output signal dependent on this comparison) 40 with a reference value VREF to obtain a voltage difference VDIF. The load line circuit 41 divides this difference by the required output impedance RU of the converter to obtain the desired load line reference current LLR (also referred to as reference level). The adder 33 adds a value ½ISW to the load line reference LLR to obtain a reference peak current level RPCS. The value ½ISW represents half the peak to peak value ISW of the substantially sawtooth shaped current IL. The current comparator 31 compares the reference peak current level (also referred to as current threshold level) RPCS with the sense signal SES to obtain an error signal ER1. The flip-flop 35 comprises a reset input receiving the error signal ER1, a set input receiving the clock signal CLK, and an output to supply the input signal DS to the driver 30. The input signal DS is usually referred to as the pulse width modulator (PWM) signal.

The operation of the prior art buck converter is elucidated with respect to the waveforms shown in FIGS. 2A–2D. FIG. 2 show waveforms elucidating the operation of the prior art buck converter. FIG. 2A shows the current IL through the inductor L, FIG. 2B shows the PWM signal DS supplied to the driver 30, FIG. 2C shows the clock signal CLK, and FIG. 2D shows the error signal ER1.

The first switch S1, usually referred to as the control-FET S1 is the power switch which switches the inductor L to the positive pole of the DC-input voltage VIN when the PWM signal DS is high. For simplicity, it is assumed that the sense signal SES is equal to the current through the control-FET S1. At the instant t1, the flip-flop 35 is set by the fixed frequency clock signal CLK which has a repetition period TCLK. Consequently, the PWM signal DS changes to a high level, and the control-FET S1 couples the inductor L to the DC-input voltage VIN. The current IL through the inductor L starts to increase with a slope according to (VIN−VOUT)/L. The current through the control-FET S1 is sensed with sense element 1 to obtain the sense signal SES (in practice, this current will be scaled down by a large factor). The comparator 31 compares the sense signal SES with the reference peak current level RPCS and resets the flip-flop 35 as soon as the sense signal SES surpasses the reference peak current level RPCS at the instant t2. Consequently, the PWM signal DS changes to a low level and deactivates the switch S1 and activates the switch S2 to couple the inductor L to ground. The current through the inductor L will then decrease with a slope determined by −VOUT/L, until the clock signal CLK rises again.

To resume, the prior art buck converter terminates its on-phase at the instant t2 at which the sense signal SES crosses the reference peak current level RPCS. Thus, the actual peak current value IPEAK of the current IL is controlled by the reference peak current level RPCS. This is why the prior art buck converter is usually referred to as being peak current controlled. The reference peak current level RPCS is a level that dynamically changes with the load current ILO because the output voltage VOUT across the load LO changes when the output current ILO required by the load LO changes. The output voltage VOUT is compared with the reference value VREF. Any deviation of the output voltage VOUT from this reference value VREF gives rise to the voltage difference VDIF. Through division of this voltage difference VDIF by RU in circuit 41, a load line reference current LLR is obtained. This load line reference current LLR represents the average output current that matches with the detected output voltage (VOUT) according to the load line definition. The adder 33 adds the fixed factor ½ ISW to the load line reference current LLR to statically account for the difference of the peak value IPEAK and the average value IAVE of the substantially triangular shaped inductor current signal IL.

The on-phase of the converter is the phase during which the inductor L is coupled to the positive pole of the DC-input voltage VIN, this is the period in time when the control FET S1 is conductive as indicated by TCF. An off-phase of the converter is the phase during which the inductor L is coupled to ground, this is the period in time when the sync FET S2 is conductive as indicated by TSF.

In the particular applications, such as the generation of the supply voltage of 1.5 Volts for a microprocessor, it is required that the output voltage VOUT decreases with increasing output current or load-current ILO according to a so-called load-line. The required load-line is followed if the converter is modeled as a voltage source with a source impedance RU. For example, a voltage drop of 1.5 mV for each Ampere load current ILO is a typical value. Accuracy demands are related to this load-line: the output voltage must stay within a predetermined margin around the load line. For example, the margin may be ±25 mV. This very accurate load line behavior is even required of the load current ILO changes from 10 to 60 amperes within 200 nanoseconds.

In the prior art buck converter, the relation between the peak current value IPEAK and the output voltage VOUT is:

$$IPEAK = \frac{VREF - VOUT}{RU} + \frac{1}{2}ISW$$

In which ISW represents the peak-to-peak swing of the triangular shaped wave form of the current IL through the inductor (or transformer). In practice, it is the load LO that determines the output current ILO that is required and the control loop that determines the output voltage VOUT at which this current ILO can be supplied to the load LO, thus:

$$VOUT = VREF - RU \cdot (IPEAK - \tfrac{1}{2}ISW)$$

The correction of the peak current IPEAK with ½ISW is necessary in order to relate the load line of the regulator to the average load current IAVE and not to the peak-current IPEAK. If IAVE=IPEAK−½ISW, then the equation becomes:

$$VOUT = VREF - RU \cdot IAVE$$

This is exactly the desired load line function wherein RU is the desired output impedance of the converter.

However the fixed correction of ½ISW is not accurate because the swing ISW is determined by the clock period, the input and output voltage, and the inductor value. In a practical worst-case situation, the inductor L may have half the nominal value. Then the swing ISW of the current signal becomes twice as large. The average current of each phase would be estimated incorrectly by as much as ½ISW. Consequently a large error will occur with respect to the required load-line.

FIG. 3 shows a buck converter with an average current control in accordance with an embodiment of the invention.

The series arrangement of the controllable switches S1 and S2 is arranged to receive the DC input voltage VIN. The junction of the switches S1 and S2 is coupled via the inductor L to the load LO to supply the output voltage VOUT. A smoothing capacitor C is arranged in parallel with the load LO. A driver circuit 30 controls the switches S1 and S2 with the switching signals SI1 and SI2, respectively. The current through the inductor L is denoted by IL. A sensing element 1 is used to sense at least part of the inductor current IL or of the current through one of the switches S1, S2. In the last case the sense element 1 can be arranged on either side of the switches S1, S2 and not necessarily as shown in FIG. 3.

The reference level circuit 4 comprises a comparator 40 and a load line circuit 41. The output voltage VOUT is compared by the comparator 40 with a reference value VREF to obtain a voltage difference VDIF which is the difference between the reference value VREF and the output voltage VOUT. The load line circuit 41 divides this difference by the required output impedance RU of the converter to obtain the desired load line reference LLR.

The adder 33 adds the load line reference LLR to the average correction signal ACS to obtain the reference peak current level RPCS. Now, the reference peak current level RPCS depends on the value of the output voltage VOUT and on the actual average value of the current IL. The comparator 31 compares the reference peak current level RPCS with the sense signal SES supplied by the sense circuit 1 to obtain an error signal ER1. The flip-flop 35 comprises a reset input receiving the error signal ER1, a set input receiving the clock signal CLK and an output to supply the input signal DS to the driver 30.

The averaging circuit 2 comprises a comparator 20, an optional window circuit 22, an integrator 21 and a loop filter 25. The comparator 20 determines the difference ER2 between the sense signal SES and the load line reference LLR. The load line reference LLR is in fact the correct required average current: LLR=(VREF−VOUT)/RU. Consequently, the difference ER2 indicates the difference between the actual current through the inductor L and the required average current. This difference ER2 is integrated with the integrator 21 and filtered with the loop filter 25 to obtain the average correction signal ACS.

The operation of the averaging circuit 2 is improved by adding a window circuit 22 which windows the error signal ER2 such that the error signal ER2 is integrated during a window in time WI only. The window in time WI is selected optimally to prevent disturbances in the sense signal SES to influence the average correction signal ACS.

To resume, in the prior art peak-control loop the adjustment peak level signal of ½ISW was used as a static correction for the error made in the estimation of the swing ISW in order to improve the accuracy of the prior art buck converter. In an aspect in accordance with the invention, this static correction is replaced by an extra control loop which comprises the averaging circuit 2 and the combiner 33. The extra control loop causes the reference peak current level RPCS to depend on the actual average value of the current IL through the inductor L. In an embodiment, the extra control loop dynamically adjusts the peak value IPEAK of the current IL in accordance with the average value of the sense signal SES.

Because of the negative feedback and using an integrator, the extra control loop will control the buck converter such that the difference between the input signals (the load line reference LLR and the sense signal SES) of the comparator 20 averages to zero. As a result the averaged sense signal SES within the time-window is made equal to the load line reference LLR.

The extra control loop provides a relatively slow adjustment with the average value of the current IL. However, because the peak value IPEAK is still directly related to VOUT, the fast load step response of the prior art peak-control is preserved.

The sense signal SES may directly relate to the current IL through the inductor L. For example, the sense circuit 1 may comprise a resistor or a current transformer arranged in series with the inductor L. It is also possible to sense the current through the control FET S1 during the on-phase of the converter (the PWM signal DS is high) or to sense the current through the sync FET S2 during the off-phase of the converter (the PWM signal DS is low). Because the prior art peak-current control shown in FIG. 1 requires a sense signal which represents the current through the control FET S1, the buck converter shown in FIG. 3 is explained for the use of this same sense current. The current through the control FET S1 may be obtained in any known manner, for example, by implementing a current mirror FET associated with the control FET S1 which mirrors the current through the control FET S1 (not shown).

If the sense signal SES is based on the current sensed in the control FET S1, the window circuit 22 generates the window in time during at least part of the duration of the on-phase of the converter. The window in time is selected to prevent disturbance in the sense signal which deteriorate the determination of the average current signal ACS.

Disturbances in the sense signal SES may occur because of delay and settling phenomena when the control FET S1 is switched on at the start of the PWM signal DS. Further, the current through the control FET S1 may become negative (which happens when the average current IAVE is smaller than half the swing ISW). If the current mirror cannot cope with this negative current, the sense signal SES becomes invalid. These periods in time during which the sense signal SES is disturbed or invalid are disregarded when the window is selected appropriately.

The configuration shown in FIG. 3 elucidates an embodiment of the invention only. Several variants of the same concept are possible. In preferred embodiments wherein the peak current control circuitry of the prior art is used as much as possible, the main steps are listed in the following. An error signal ER2 is determined from the (current) sense signal SES and the load line reference signal LLR (which is based on the output voltage VOUT and the desired load line slope). This error signal ER2 is integrated and/or low-pass filtered, and the result is used to adjust the reference peak current level RPCS which determines the peak level IPEAK of the current through the inductor L. The adjustment of the peak-level IPEAK of the current IL closes a negative feedback loop. The feedback loop reduces the error signal ER2 to almost zero, and thus makes the average of the sense signal SES equal to the load line reference signal LLR. The invention enables to realize a fast peak-control regulator with a load-line function based on average load current instead of the peak current.

The operation of the buck converter in accordance with the invention, more specifically the embodiment shown in FIG. 3, is elucidated with respect to the waveforms shown in FIGS. 4A–4F. FIG. 4A shows the PWM signal DS supplied to the driver 30, FIG. 4B shows the current IL through the inductor L, FIG. 4C shows the current ICF through the control FET S1 and the current ISF through the sync FET S2, FIG. 4D shows the sense signal SES, FIG. 4E shows the window in time WI, and FIG. 4F shows the output signal ERW of the window circuit 22.

At the instant t1, the flip-flop 35 is set by a fixed frequency clock signal CLK. Consequently, the PWM signal DS changes to a high level, and the control-FET S1 couples the inductor L to the DC-input voltage VIN. The current IL through the inductor L starts to increase according to (VIN−VOUT)/L. The current ICF through the control-FET S1 is sensed to obtain the sense signal SES. The comparator 31 compares the sense signal SES with the reference peak current level RPCS and resets the flip-flop 35 as soon as the sense signal SES surpasses the reference peak current level RPCS at the instant t4. Consequently, the PWM signal DS changes to a low level and deactivates the switch S1 and activates the switch S2 to couple the inductor L to ground. The current through the inductor L will then decrease by −VOUT/L, until the clock signal CLK rises again at the instant t5. The reference peak current level RPCS now depends on the average correction signal ACS.

The sense signal SES is windowed with a window in time WI lasting from the instant t2 to the instant t3. The output signal ERW of the window circuit 22 is zero outside the window WI and is equal to the sense signal SES within the window WI. The integrated and/or low-pass filtered output signal INT is the average correction signal ACS which is added to the load line reference LLR to provide the reference peak current level RPCS.

A practical converter which has to provide a load current ILO up to 60 Amperes at an output voltage VOUT of 1.5 Volts from a DC-input voltage VIN of 12 Volts, preferably consists of multiple inductors (not shown) all coupled to the load LO. Each of the inductors being switched by an associated driver circuit which receives an associated PWM signal from an associated flip-flop to control the associated control FET and a sync FET. The set of the flip-flops is set by clock signals which are shifted in time. In this manner, in the time period between the instants t1 and t5, the multiple converters, each converter comprising one of the multiple inductors, supply current to the load LO, successively. The waveforms shown in FIG. 4 show a converter which supplies an increasing current to the load LO during the on-phase of the converter which last from the instant t1 to the instant t4, and a decreasing current after instant t4. Another one of the converters may have an on-phase which starts just after the instant t4 and then provide increasing current to the load. In this way, the ripple of the total output current, and hence on the output voltage VOUT is minimized. This type of converter is referred to as a multi-phase converter.

For low average currents IAVE through the inductor L a useful window in time WI can become very small. It is possible to improve the sense circuit 1 such that it is able to measure negative currents ICF through the control FET S1. Then the window in time WI can cover the part where the current ICF through the control-FET S1 is negative. Unfortunately this increases the complexity of the circuit design. Another preferred average current circuit 2 which provides a remedy against a too short window in time WI will be elucidated with respect to FIGS. 5 and 6.

FIG. 5 shows an embodiment of the averaging circuit. The averaging circuit 2 comprises the comparator 20 that compares the sense signal SES with the load line reference LLR to supply the error signal ER2 to the multiplier 230. The multiplier 230 multiplies the error signal ER2 with the PWM signal DS to supply a signal ER20 to a multiplier 231. The multiplier 231 is arranged between the current source 232 and the input of the integrator 21. The current source 232 supplies a current IR with a fixed value and polarity. The integrator 21 comprises an operational amplifier 210 and a capacitor 211. The integrator integrates the input signal IIN and supplies the integrated input signal ST.

The operation of the averaging circuit shown in FIG. 5 is elucidated with respect to the waveforms shown in FIGS. 6A–6D. FIG. 6A shows the PWM signal DS, FIG. 6B shows the sense signal SES, FIG. 6C shows the input signal IIN of the integrator 21, and FIG. 6D shows the integrated input signal INT.

When the PWM signal DS has the low level, the signal ER20 is zero and thus the input signal IIN of the integrator is zero. When at the instant t10, the PWM signal DS becomes high, the sense signal SES has a value lower than the load line reference LLR and thus the signal ER2 is positive. Consequently, also the signal ER20 is positive and the direction of the current IR of the current source 232 is such that a positive current IIN=+IR is drawn from the input of the integrator 21 and the output voltage INT of the integrator 21 rises. At the instant t11, the sense signal SES reaches the level of the load line reference LLR. In the time period from the instant t11 to t12, the signal ER2 is negative and thus also the signal ER20 is negative. Now the current IR of the current source 232 is inverted, the integrator input current is negative IIN=−IR, and the output voltage of the integrator 21 decreases.

The operation of this average current circuit 2 is based on the fact that the average of the sense signal SES which is representative for the current ICF through the control-FET S1 must equal the level ((VREF−VOUT)/RU) of the load line reference LLR. This equilibrium is obtained if the sense signal SES crosses the load line reference LLR exactly in the middle of the PWM pulse DS lasting from the instant t10 to the instant t12. Thus, instead of integrating the error signal ER2 itself, a clean signal (the constant current IR) is integrated. The polarity of this clean signal is reversed at the instant t11 the sense signal SES crosses the load line reference LLR. This instant t11 can easily and accurately be detected by the comparator 20. The integrator action of the integrator 21 is stopped (or, the input signal IIN is zero-ed) at the end of the PWM pulse DS.

If the polarity of the input signal IIN switches exactly in the middle of the PWM pulse DS, then the output signal INT of the integrator 21 at the instants t10 and t13 is identical. If not, then the integrator output signal INT will change by ΔV in each pulse of the PWM signal DS. Consequently, the output signal INT of the integrator 21 is proportional to the integrated difference between the sense signal SES and load line reference LLR over the entire pulse of the PWM signal DS. This is similar to the error integrator 21 shown in FIG. 3 when the window WI covers the complete on-phase. However the error integrator 21 of FIG. 5 is much easier to implement in an integrated circuit. The only demands for this integrator are that the sense signal SES is accurate at the instant t12 of switching, and that the positive and negative integration match well.

FIGS. 8A–8E show waveforms elucidating the operation of the averaging circuit 2 shown in FIG. 7. FIG. 8A shows the PWM signal DS, FIG. 8B shows the sense signal SES, FIG. 8C shows the error signal ER2, FIG. 8D shows the input signal IIN of the integrator 21, and FIG. 8E shows the integrator output signal INT.

When the PWM signal DS has the high level, the signal ER20 is zero and thus the input signal IIN of the integrator is zero. Thus, from the instant t20 to the instant t21, the input signal IIN is zero. At the instant t21 when the PWM signal DS becomes low, the sense signal SES has a value higher than the load line reference LLR and thus the signal ER2 is negative. Consequently, also the signal ER20 is negative and the direction of the current IR of the current source 232 is inverted such that a negative current IIN=−IR is supplied to the input of the integrator 21 and the output voltage INT of the integrator 21 decreases. At the instant t22, the sense signal SES reaches the level of the load line reference LLR. In the time period from the instant t22 to the instant t23, the signal ER2 is positive and thus also the signal ER20 is positive. Now the current IR of the current source 232 is not inverted and the output voltage of the integrator 21 increases. At the instant t23 the PWM signal DS starts the next high level pulse with a negative offset of ΔV.

The integrator 21 will supply an output signal INT with a non-zero offset ΔV as long as the instant t22 does not occurs exactly in the middle of the off-period (t21 to t23). The non-zero offset ΔV causes the converter to control the reference peak current level RPCS until the offset ΔV is zero.

Figure 5:
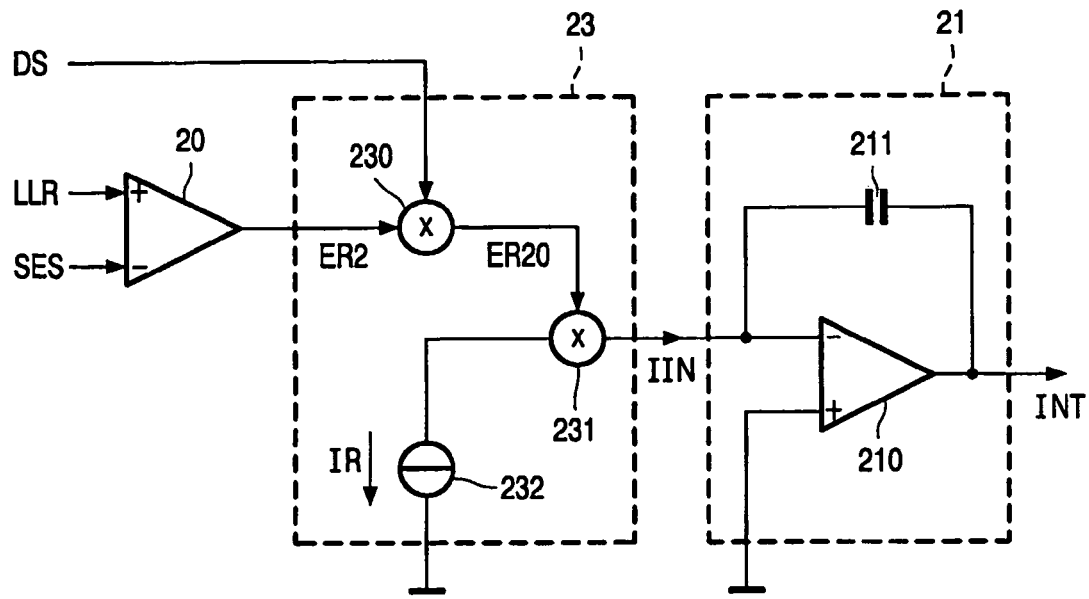

The waveforms of FIGS. 6A–6D for the averaging circuit 2 of FIG. 5 show the situation when the sense signal SES is based on the current ICF through the control FET S1. The waveforms of FIGS. 8A–8E for the average current circuit 2 of FIG. 7 show the situation when the sense signal SES is based on the current ISF through the sync FET S2.

In buck converters which have to supply an output voltage VOUT which is much lower than the DC-input voltage VIN (for example, VIN is 12 Volts and VOUT is 1.5 Volts) the off-phase of the converter lasts much longer than the on-phase (a small duty cycle). The sense signal SES is invalid after the start of the off-phase at the instant t21 because of settling phenomena in the sync-FET S2 and in the current sense circuit 1. The sense signal may also be invalid at the end of the off-phase because the current of the sync-FET S2 may cross zero and change sign (which happens when the average current IAVE<½ISW). Despite both these periods in time wherein the sense signal SES is or may be invalid, the remaining time window in which the sense signal SES is valid (for example from 100 ns after the instant t21 until the sense signal SES crosses zero, if so) is much larger than the valid period in time during the on-phase.

Figure 7:
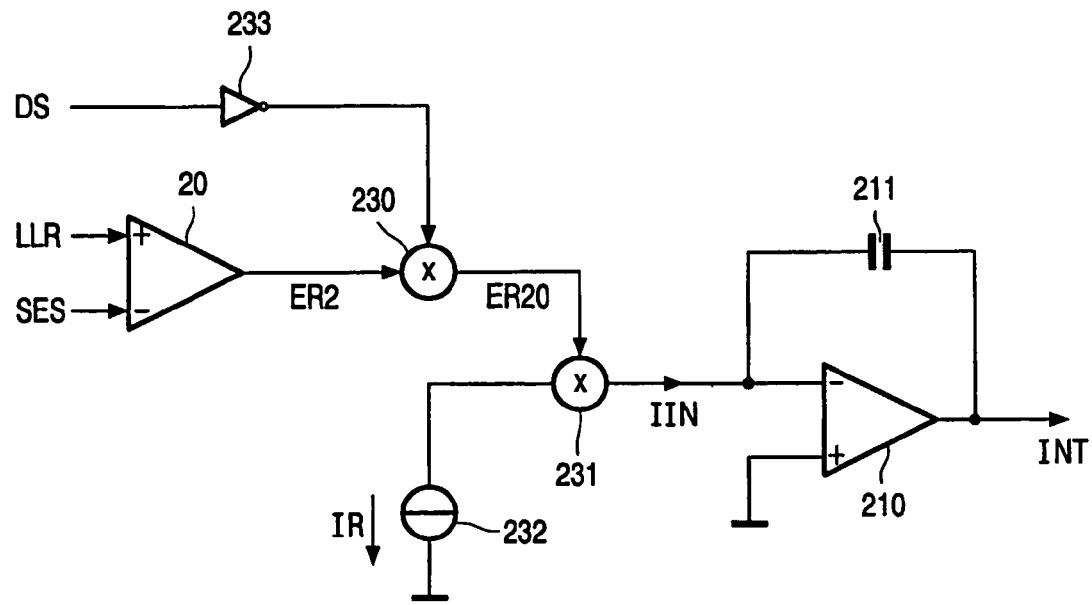
FIG. 7 shows an embodiment of the averaging circuit. This embodiment of the averaging circuit 2 only differs from the embodiment shown in FIG. 5 in that an inverter 233 is added to invert the PWM signal DS.

The major advantage of the averaging circuits in FIG. 5 and FIG. 7 is that a windowing function is not required because a clean input signal IR is used for integration. Only at the moment that the sense signal SES crosses the load line reference LLR, the sense signal needs to be valid and accurate. In the steady state, this crossing will always occur at a positive sense signal SES, because the average load current can only be positive, ILO>0.

An advantage of the averaging circuit in FIG. 7 with respect to that of FIG. 5 is that the effect of a delay between the PWM signal DS and the actual switching of the signals in the average current circuit 2 has less influence because of the slower slope of the sense signal SES in the sync-FET S2 phase.

Figure 9:
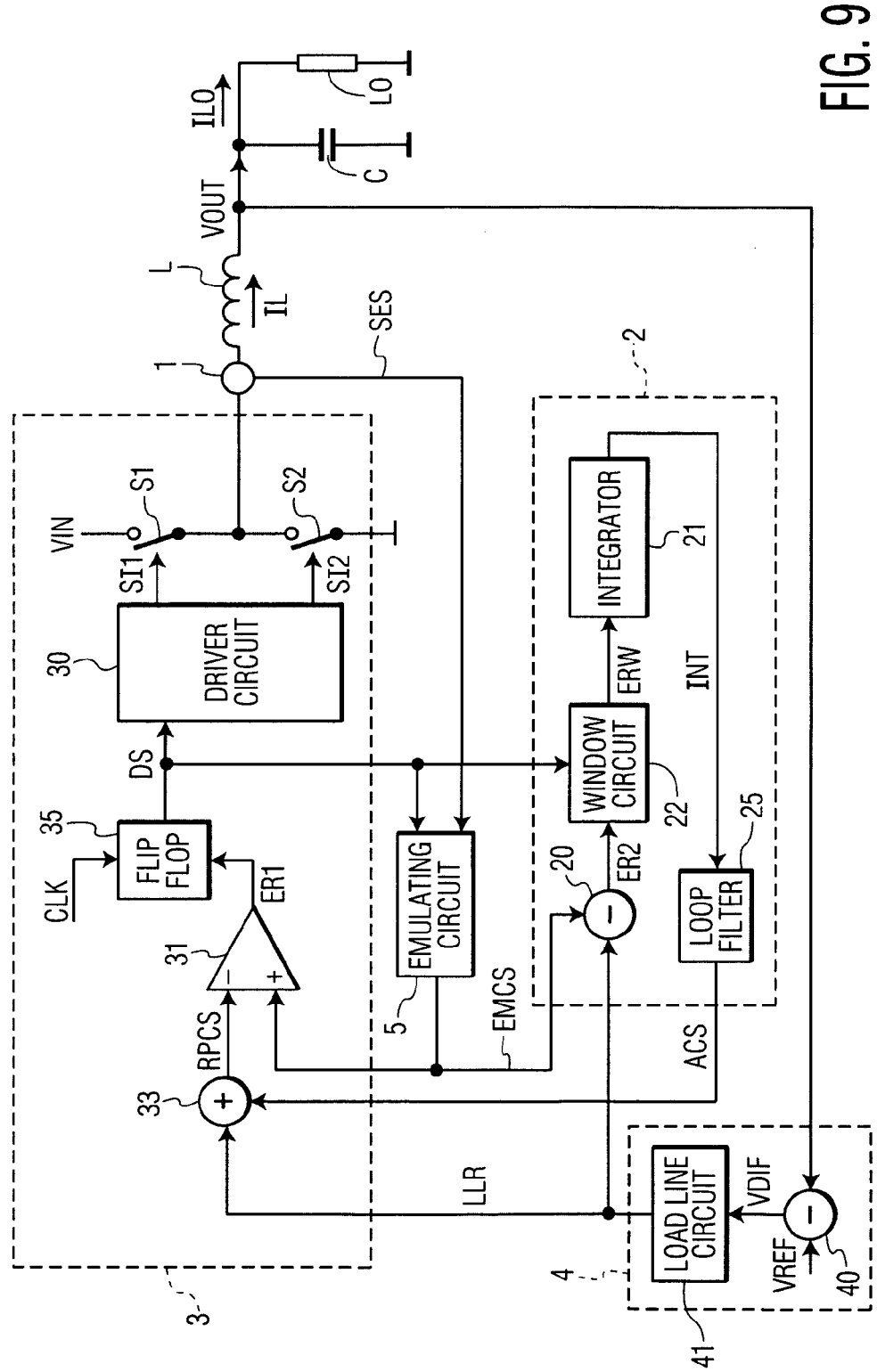

FIG. 9 shows a buck converter with an average current control and a current emulator in accordance with an embodiment of the invention.

Figure 1:
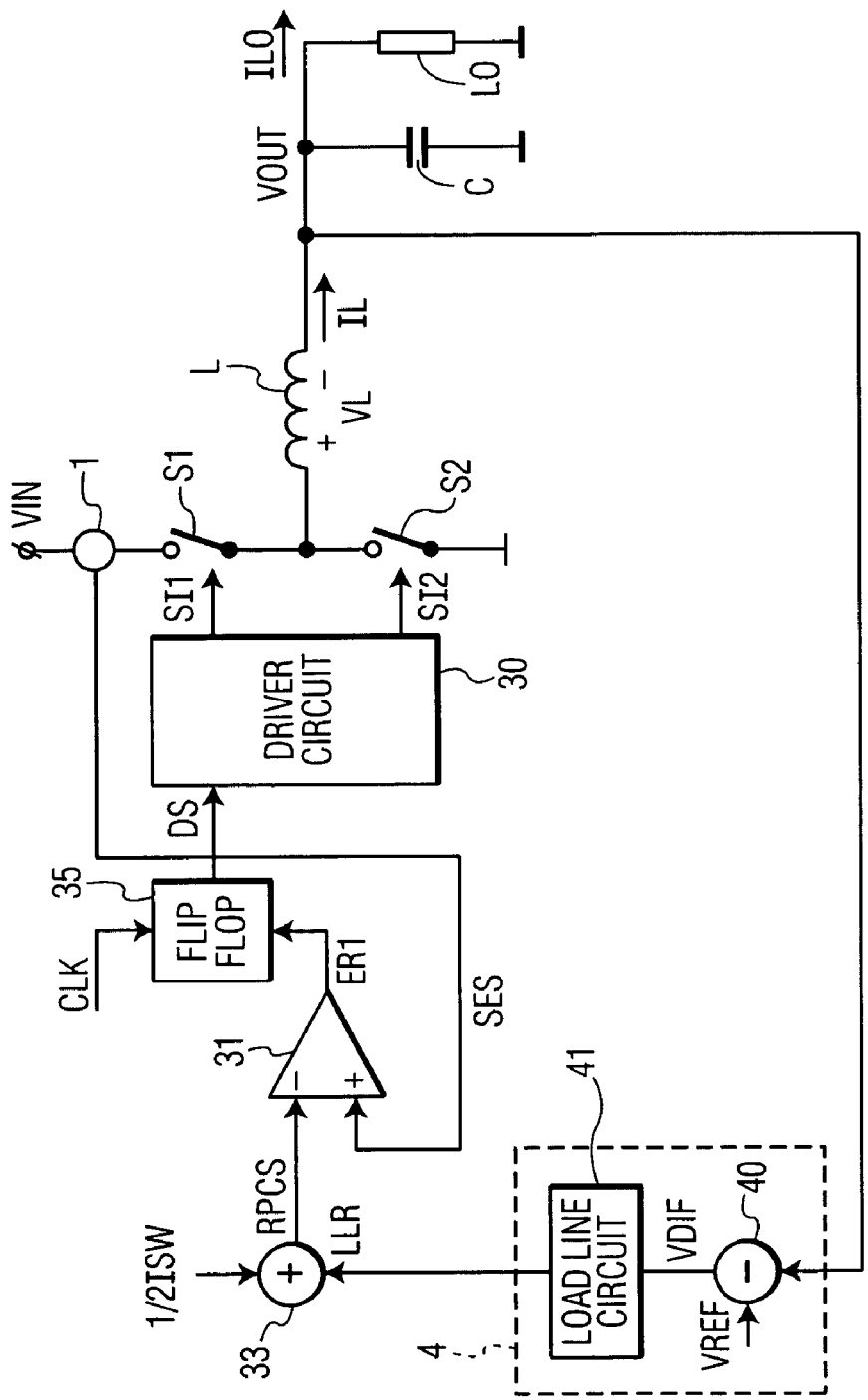
Figure 2:
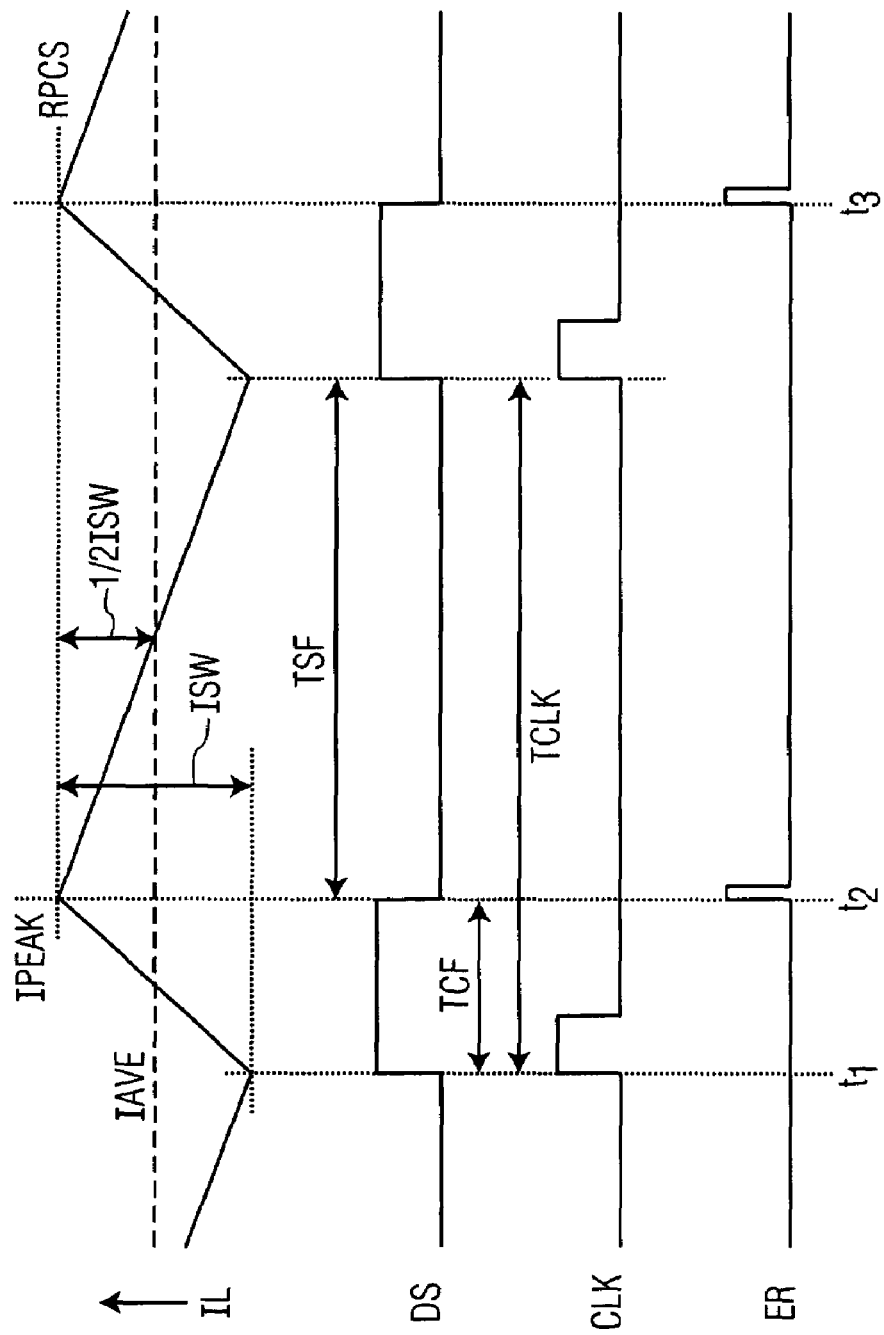
Figure 3:
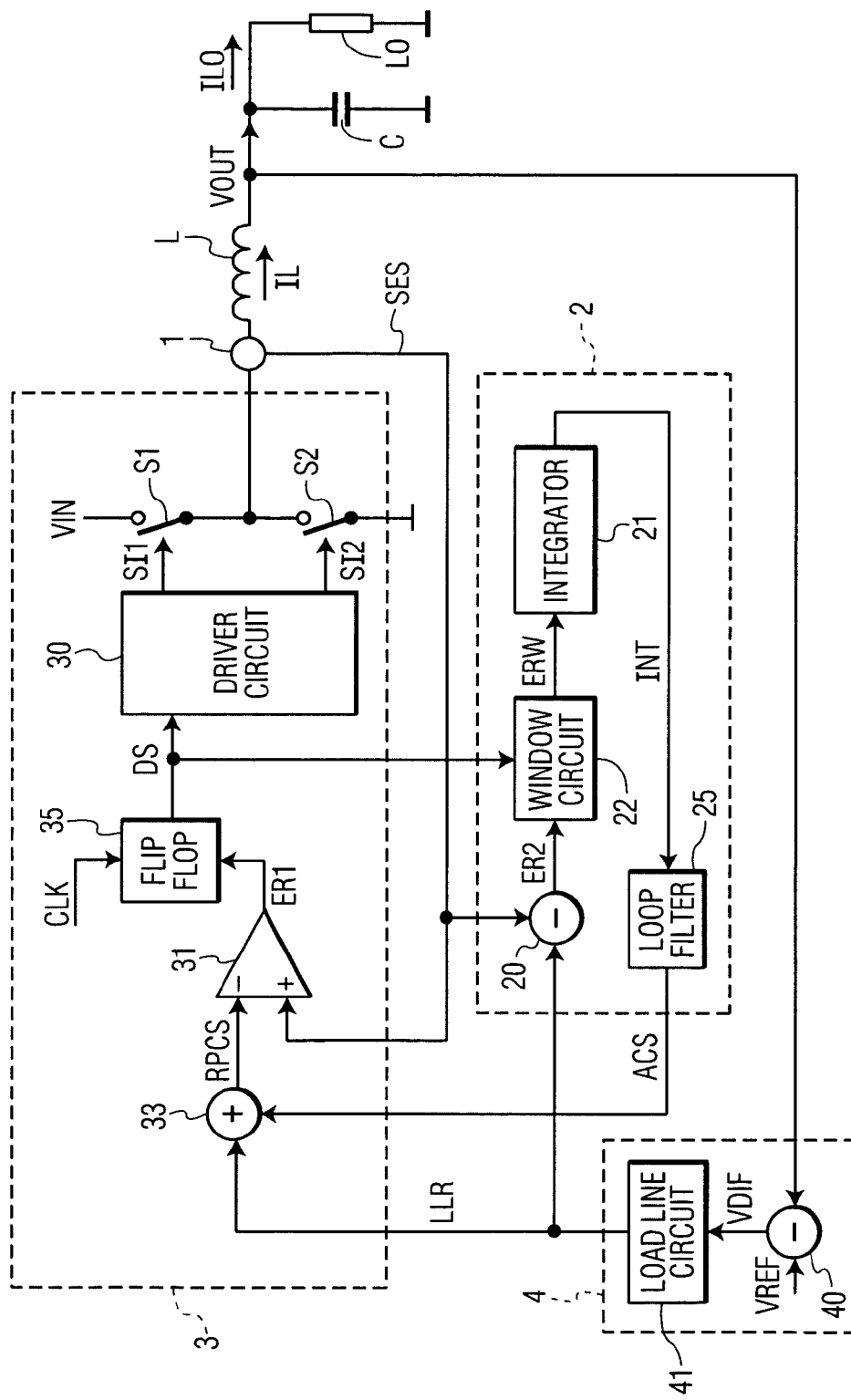
Figure 4:
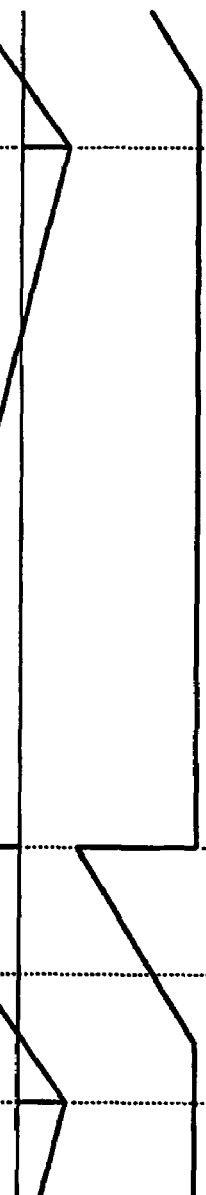

The only difference between the buck converter shown in FIG. 9 and the buck converter shown in FIG. 3 is that the emulating circuit 5 has been added which supplies an emulated current signal EMCS which is an emulation of the current through the inductor L based on the sense signal SES. The emulated current signal EMCS is supplied to the comparators 20 and 31 instead of the sense signal SES. It is also possible to replace the sense signal SES with the emulated current signal EMCS for one of the comparators 20 and 31 only.

The emulating circuit 5 may comprise a generator (not shown) which emulates a current signal being representative of a current to be emulated based on timing information which represents the repetition time and the duty cycle of the PWM signal DS. The current to be emulated may be the inductor current IL. A comparator compares the emulated signal with the current to be emulated to obtain an error signal. A generator controller receives the error signal to supply a control signal to the generator to adapt a property of the emulated signal to become substantially equal to a property (for example the amplitude and/or a DC offset) of the current to be emulated. Such an emulating circuit 5 is disclosed in the non-prepublished European patent application 02077196.0 , the priority of which is claimed herein.

The emulated current signal EMCS, which is a clean copy of the current IL through the inductor L, is less disturbed than the sense signal SES. Thus, the use of the emulated current signal EMCS improves the accuracy of the load line behavior of the buck converter.

To conclude, preferred embodiments in accordance with the invention use a dynamic load line adjustment technique to provide a DC—DC converter which combines the fast response of the prior art peak-control with an accurate load line positioning of the regulated output voltage VOUT.

It should be noted that the above-mentioned embodiments illustrate rather than limit the invention, and that those skilled in the art will be able to design many alternative embodiments without departing from the scope of the appended claims.

For example, the dynamic load line adjustment can be applied in a prior art peak-current regulator which senses the current through the control FET S1 or the coil current (positive slope), but also in a more-complicated peak-current regulator based on emulation of the current IL through the inductor L which uses the current through the sync FET S2 (negative slope). But other combinations are possible as well.

Furthermore, the concept of the averaging circuit can be applied in prior art buck converters which are based on valley detection of a sense signal representative for the current IL through inductor L or the current through the sync FET S2. Such valley controlled converters operate in an inverse but very similar manner as the more common peak controlled converter. Any reference in the claims to "switch current level" can be interpreted as "peak current level" in case of a peak controlled converter and as "valley current level" in case of a valley controlled converter.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A DC—DC converter comprising
an inductor and an electronic switch for periodically supplying a DC-input voltage to the inductor during an on-phase wherein an inductor current through the inductor increases,
a sense circuit for generating a sense signal representing at least part of the inductor current,
a reference level circuit for generating a reference level depending on a difference between an output voltage of the DC—DC converter and a predetermined reference value,
an averaging circuit for generating an average correction signal representing a difference between a current threshold level and an actual average value of the inductor current, and
a controller for regulating a duty-cycle of the on-phase dependent on a comparison of the sense signal with the current threshold level, wherein the current threshold level is dependent on the reference level and the average correction signal.

2. A DC—DC converter as claimed in claim 1, characterized in that the DC—DC converter is a buck converter comprising a series arrangement of main current paths of the first mentioned electronic switch and a further electronic switch, said series arrangement being arranged for receiving the DC input voltage, the inductor being arranged between a junction of the main current paths and a smoothing capacitor for supplying the output voltage across the smoothing capacitor, and in that the controller comprises a driver circuit for generating switching signals to control the first mentioned and the further switch to terminate either the on-phase or an off-phase of the buck converter based on the sense signal and the switch current level, wherein either during the on-phase the inductor is connected to a pole of the DC input voltage causing an increasing current through the inductor, or during the off-phase the inductor is connected to a pole of the DC input voltage causing a decreasing current through the inductor.

3. A DC—DC converter as claimed in claim 2, characterized in that the controller further comprises a current comparator for comparing the sense signal with the current threshold level to obtain an input signal for the driver circuit, and in that the controller further comprises a combiner for combining the average correction signal with the reference level to obtain the current threshold level.

4. A DC—DC converter as claimed in claim 3, characterized in that the DC—DC converter comprises an emulator circuit for emulating the current in the inductor to obtain an emulated current signal, and in that the current comparator is arranged for receiving the emulated current signal instead of the sense signal.

5. A DC—DC converter as claimed in claim 1, characterized in that the averaging circuit comprises a current comparator for comparing the sense signal with the reference level to obtain an error signal, and an integrator for integrating and/or a low pass filter for filtering the error signal to obtain the average correction signal.

6. A DC—DC converter as claimed in claim 5, characterized in that the averaging circuit further comprises a window circuit for indicating a window in time during which the comparison of the sense signal with the reference level is relevant.

7. A DC—DC converter as claimed in claim 5, characterized in that the averaging circuit further comprises a current source for supplying a current having a fixed value to the integrator, the error signal being coupled to a control input of the current source for switching a polarity of the current substantially at an instant the sense signal crosses a value indicated by the reference level.

8. A DC—DC converter as claimed in claim 5, characterized in that the DC—DC converter comprises an emulator circuit for emulating the current in the inductor to obtain an emulated current signal, and in that the current comparator is arranged for receiving the emulated current signal instead of the sense signal.

9. A DC—DC converter as claimed in claim 1, characterized in that the reference level circuit comprises a load line circuit for generating the reference level from a voltage difference of the reference voltage and the output voltage, wherein the reference level indicates a desired change of the output voltage with an output current supplied to a load receiving the output voltage.

10. An electronic apparatus with a DC—DC converter comprising an inductor and an electronic switch for periodically supplying a DC-input voltage to the inductor during an on-phase wherein an inductor current through the inductor increases, a sense circuit for generating a sense signal representing at least part of the inductor current, a reference level circuit for generating a reference level depending on a difference between an output voltage of the DC—DC converter and a predetermined reference value, an averaging circuit for generating an average correction signal representing a difference between a current threshold level and an actual average value of the inductor current, and a controller for regulating a duty-cycle of the on-phase dependent on a comparison of the sense signal with the current threshold level, wherein the current threshold level is dependent on the reference level and the average correction signal.

* * * * *